(12) United States Patent
Nichols

(10) Patent No.: US 11,933,005 B1
(45) Date of Patent: Mar. 19, 2024

(54) ANIMAL WASTE COLLECTION ROBOT

(71) Applicant: Marie Nichols, Philadelphia, PA (US)

(72) Inventor: Marie Nichols, Philadelphia, PA (US)

(*) Notice: Subject to any disclaimer, the term of this patent is extended or adjusted under 35 U.S.C. 154(b) by 623 days.

(21) Appl. No.: 17/136,301

(22) Filed: Dec. 29, 2020

(51) Int. Cl.
| | |
|---|---|
| E01H 1/00 | (2006.01) |
| A01K 1/01 | (2006.01) |
| B25J 5/00 | (2006.01) |
| B25J 9/16 | (2006.01) |
| B25J 15/00 | (2006.01) |
| B60K 7/00 | (2006.01) |
| B60L 15/20 | (2006.01) |
| B60L 50/60 | (2019.01) |
| B60L 53/51 | (2019.01) |
| B60Q 1/00 | (2006.01) |
| B60R 11/04 | (2006.01) |
| B60R 16/023 | (2006.01) |
| B66C 3/02 | (2006.01) |
| B66C 13/48 | (2006.01) |
| B66C 23/42 | (2006.01) |
| G05D 1/00 | (2006.01) |

(52) U.S. Cl.
CPC .............. *E01H 1/006* (2013.01); *A01K 1/01* (2013.01); *B25J 5/007* (2013.01); *B25J 9/1612* (2013.01); *B25J 9/162* (2013.01); *B25J 9/1679* (2013.01); *B25J 15/0028* (2013.01); *B60K 7/0007* (2013.01); *B60L 15/20* (2013.01); *B60L 50/60* (2019.02); *B60L 53/51* (2019.02); *B60Q 1/0088* (2013.01); *B60R 11/04* (2013.01); *B60R 16/0231* (2013.01); *B66C 3/02* (2013.01); *B66C 13/48* (2013.01); *B66C 23/42* (2013.01); *G05D 1/0278* (2013.01); *B60K 2007/0038* (2013.01); *B66C 2700/0371* (2013.01); *G05B 2219/50391* (2013.01); *G05D 2201/0201* (2013.01)

(58) Field of Classification Search
CPC .................................. E01H 1/006; A01K 1/01
See application file for complete search history.

(56) References Cited

U.S. PATENT DOCUMENTS

| D548,411 S | 8/2007 | Schroter | |
|---|---|---|---|
| 8,527,191 B2 * | 9/2013 | Van Den Berg | A01K 1/01 250/341.8 |

(Continued)

FOREIGN PATENT DOCUMENTS

WO 2012142225 10/2012

*Primary Examiner* — Mark C Hageman
(74) *Attorney, Agent, or Firm* — Kyle A. Fletcher, Esq.

(57) ABSTRACT

The animal waste collection robot is a robot. The animal waste collection robot automatically collects befoulment generated by an animal. The animal waste collection robot is an automated device. The animal waste collection robot is an independently powered electric circuit. By independently powered is meant that the animal waste collection robot can operate without an electrical connection to an external power source. The animal waste collection robot comprises a vehicle, a crane, a control circuit, and a pan. The control circuit mounts in the vehicle. The crane and the pan mount on the vehicle. The vehicle transports the animal waste collection robot over a patrol route. The control circuit: a) scans the patrol route for befoulment; b) operates the crane to collect the befoulment; and, c) further operates the crane to transport the befoulment to the pan for storage.

18 Claims, 9 Drawing Sheets

(56) References Cited

U.S. PATENT DOCUMENTS

| | | | |
|---|---|---|---|
| 8,601,637 B2* | 12/2013 | Mainini | A01K 1/0128 |
| | | | 15/340.3 |
| 8,707,900 B1 | 4/2014 | Womble | |
| 9,119,512 B2 | 9/2015 | Martins, Jr. | |
| 10,870,958 B2* | 12/2020 | Fornarotto | A01K 1/01 |
| 10,932,437 B2* | 3/2021 | Van Den Beukel | |
| | | | A01K 1/0128 |
| 11,718,967 B2* | 8/2023 | Narita | B25J 9/163 |
| | | | 119/712 |
| 2002/0133899 A1* | 9/2002 | Van den Berg | A01K 1/01 |
| | | | 15/340.1 |
| 2003/0005531 A1* | 1/2003 | van den Berg | A01K 1/01 |
| | | | 15/49.1 |
| 2010/0006127 A1* | 1/2010 | Van Den Berg | G05D 1/0231 |
| | | | 15/21.1 |
| 2017/0090456 A1 | 3/2017 | Mao | |
| 2018/0348783 A1 | 12/2018 | Pitzer | |
| 2019/0271125 A1 | 9/2019 | Fornarotto | |
| 2023/0248204 A1* | 8/2023 | Jung | A47L 11/4069 |
| | | | 15/93.1 |

\* cited by examiner

ANIMAL WASTE COLLECTION ROBOT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture including animal husbandry, more specifically, the removal of dung. (A01K1/01)

SUMMARY OF INVENTION

The animal waste collection robot is a robot. The animal waste collection robot is adapted for use with a companion animal. The animal waste collection robot automatically collects befoulment generated by the companion animal. The animal waste collection robot is an automated device. The animal waste collection robot is an independently powered electric circuit. By independently powered is meant that the animal waste collection robot can operate without an electrical connection to an external power source. The animal waste collection robot comprises a vehicle, a crane, a control circuit, and a pan. The control circuit mounts in the vehicle. The crane and the pan mount on the vehicle. The vehicle transports the animal waste collection robot over a patrol route. The control circuit: a) scans the patrol route for befoulment; b) operates the crane to collect the befoulment; and, c) further operates the crane to transport the befoulment to the pan for storage.

These together with additional objects, features and advantages of the animal waste collection robot will be readily apparent to those of ordinary skill in the art upon reading the following detailed description of the presently preferred, but nonetheless illustrative, embodiments when taken in conjunction with the accompanying drawings.

In this respect, before explaining the current embodiments of the animal waste collection robot in detail, it is to be understood that the animal waste collection robot is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the animal waste collection robot.

It is therefore important that the claims be regarded as including such equivalent construction insofar as they do not depart from the spirit and scope of the animal waste collection robot. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
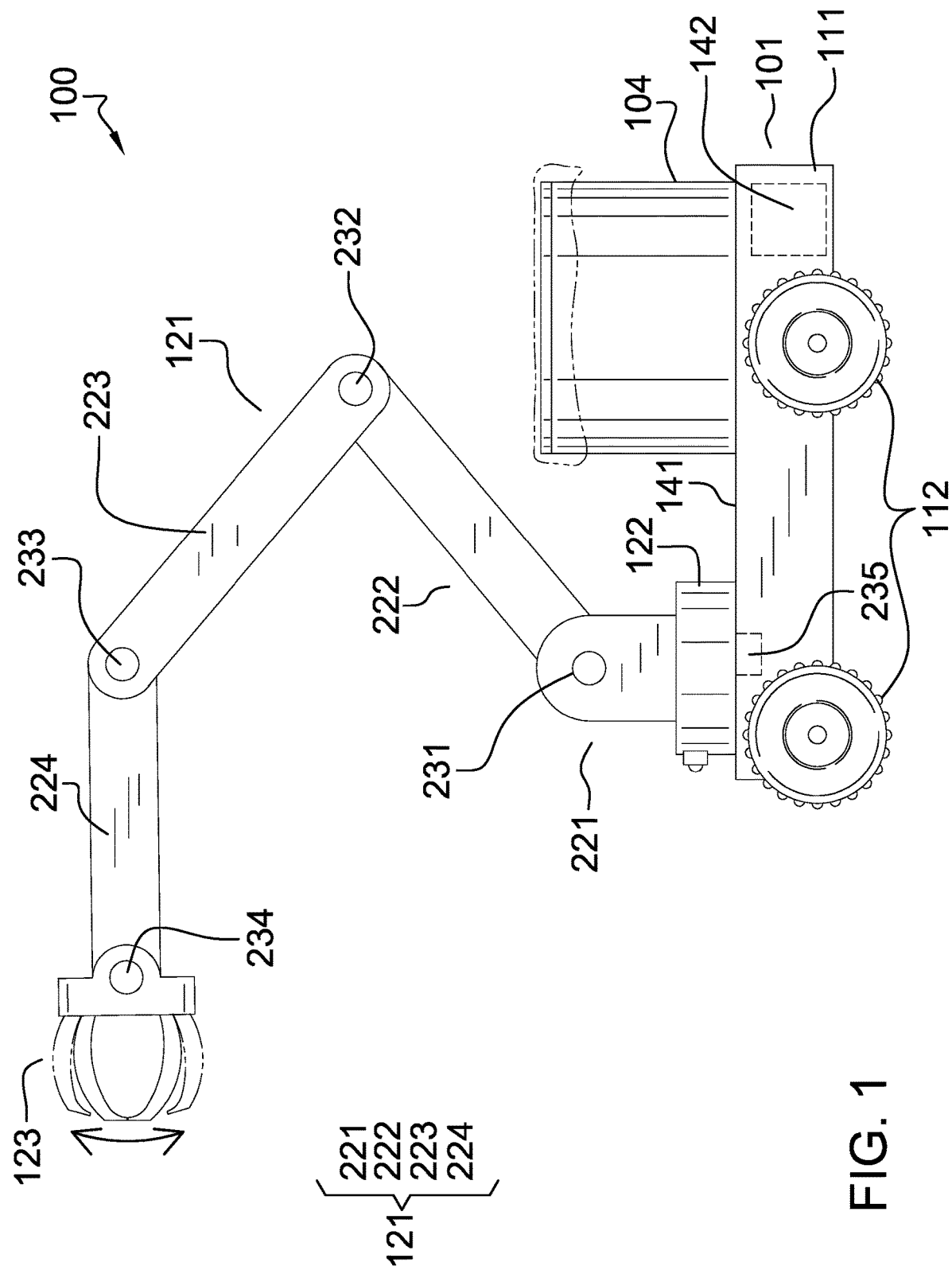
FIG. 1 is a side view of an embodiment of the disclosure.
Figure 2:
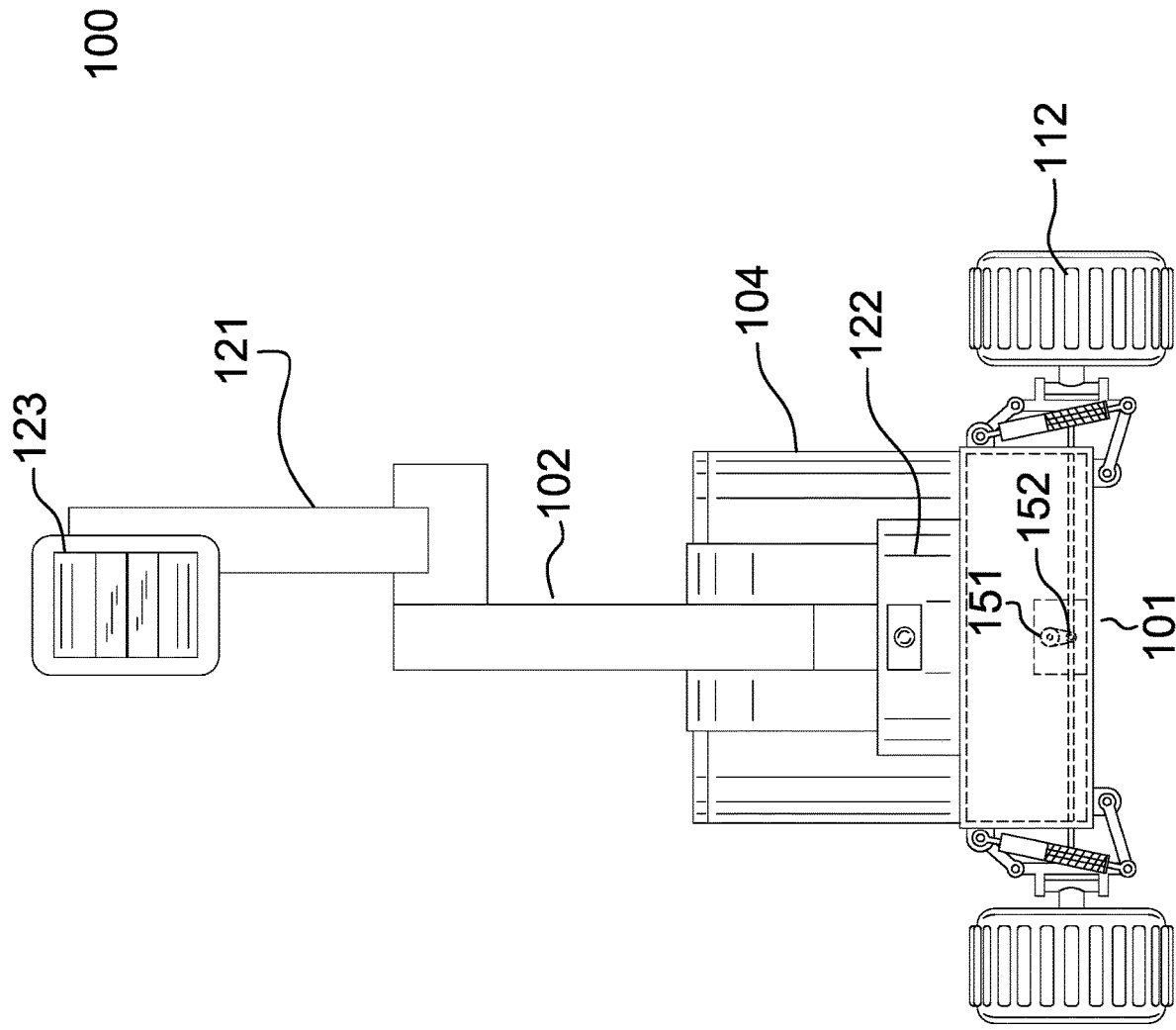
FIG. 2 is a front view of an embodiment of the disclosure.
Figure 3:
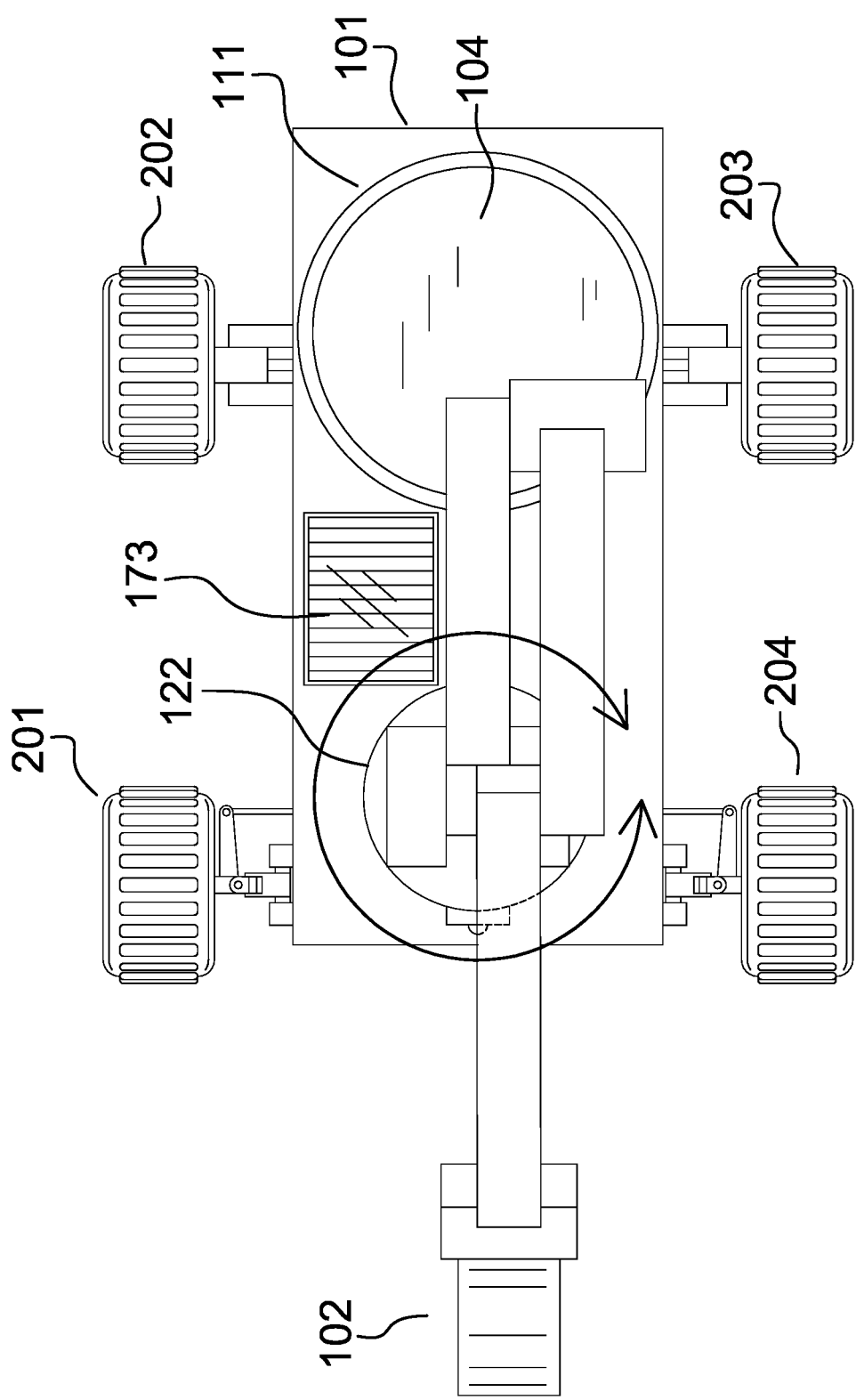
FIG. 3 is a top view of an embodiment of the disclosure.
Figure 4:
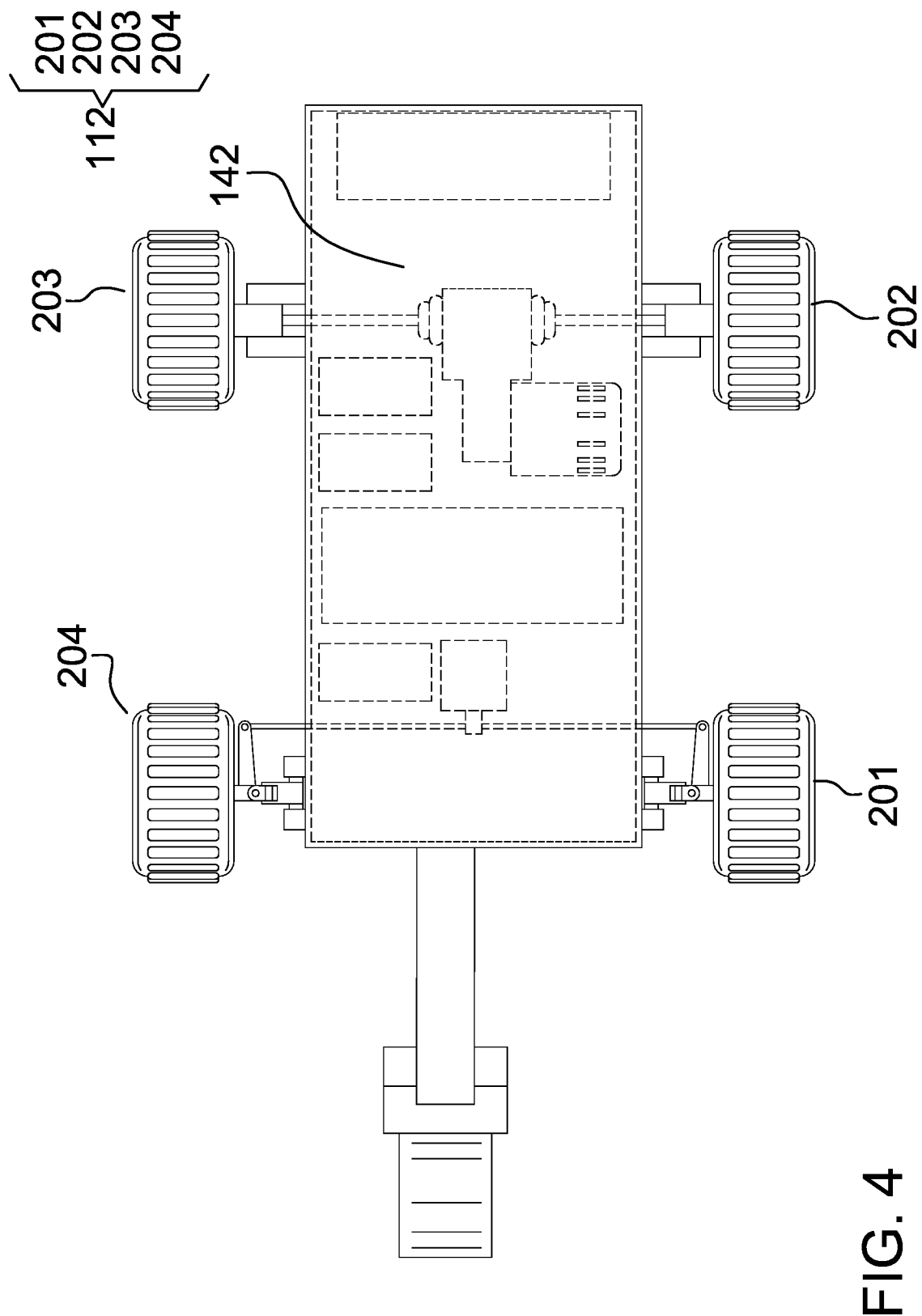
FIG. 4 is a bottom view of an embodiment of the disclosure.
Figure 5:
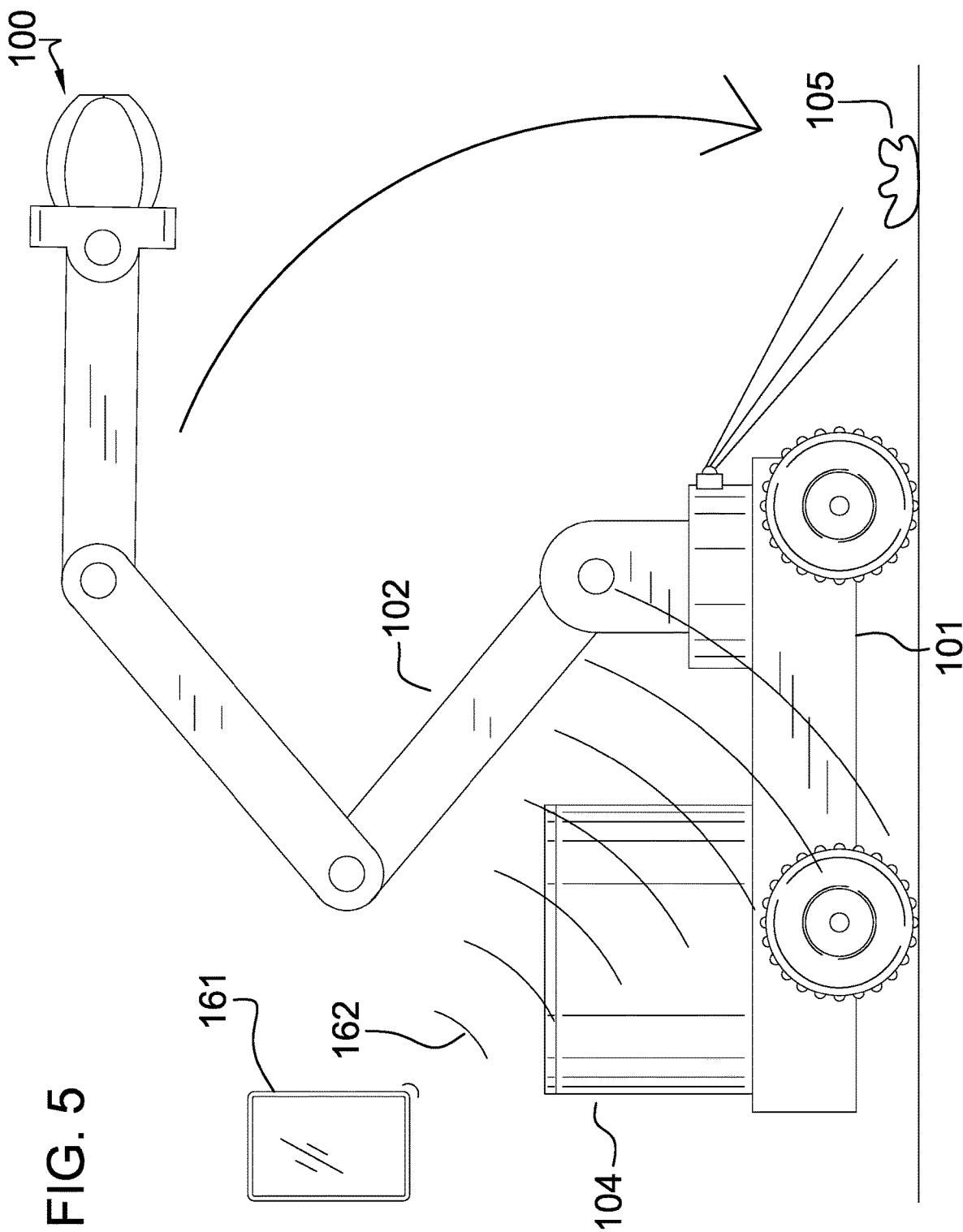
FIG. 5 is an in-use view of an embodiment of the disclosure.
Figure 6:
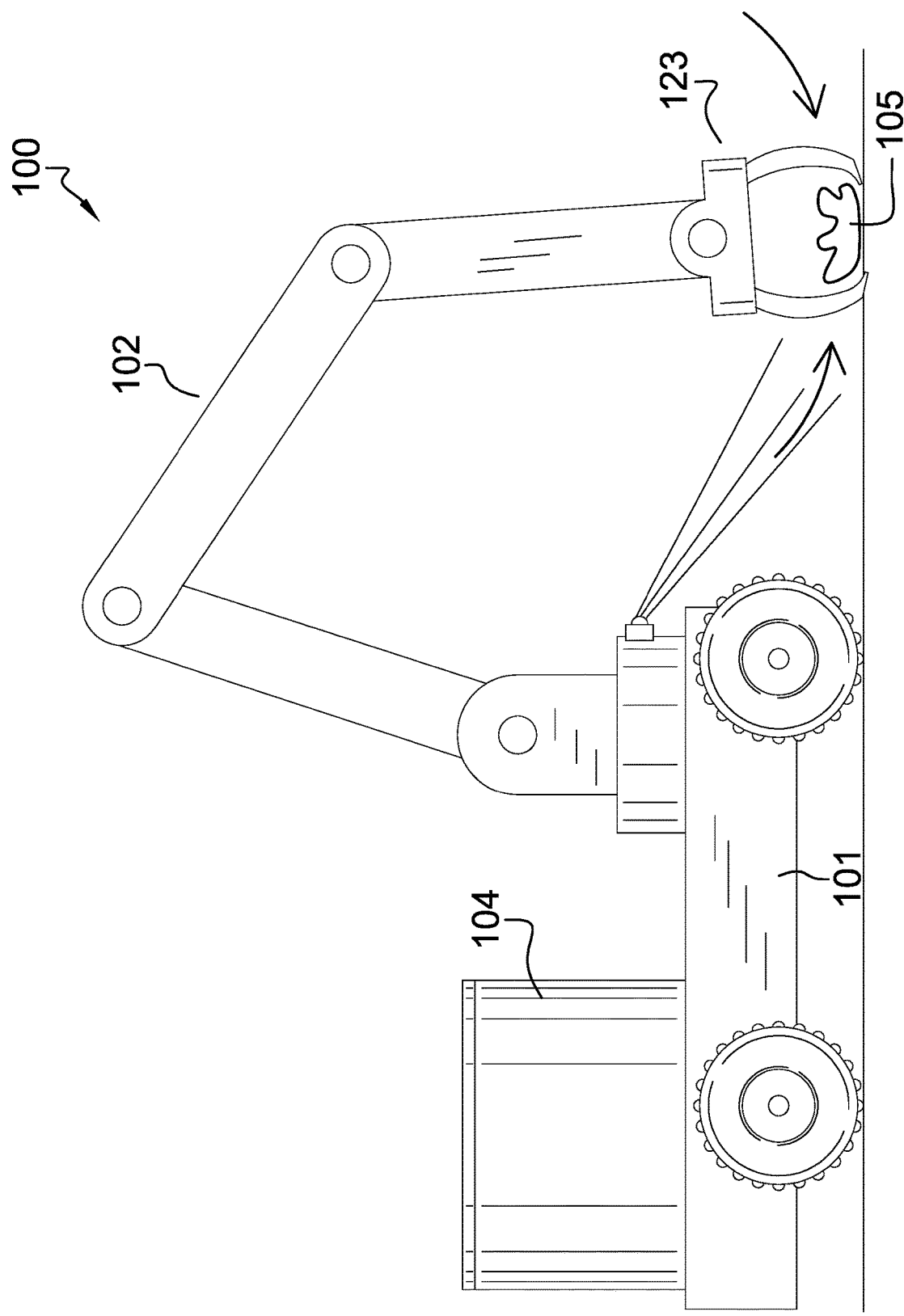
FIG. 6 is an in-use view of an embodiment of the disclosure.
Figure 7:
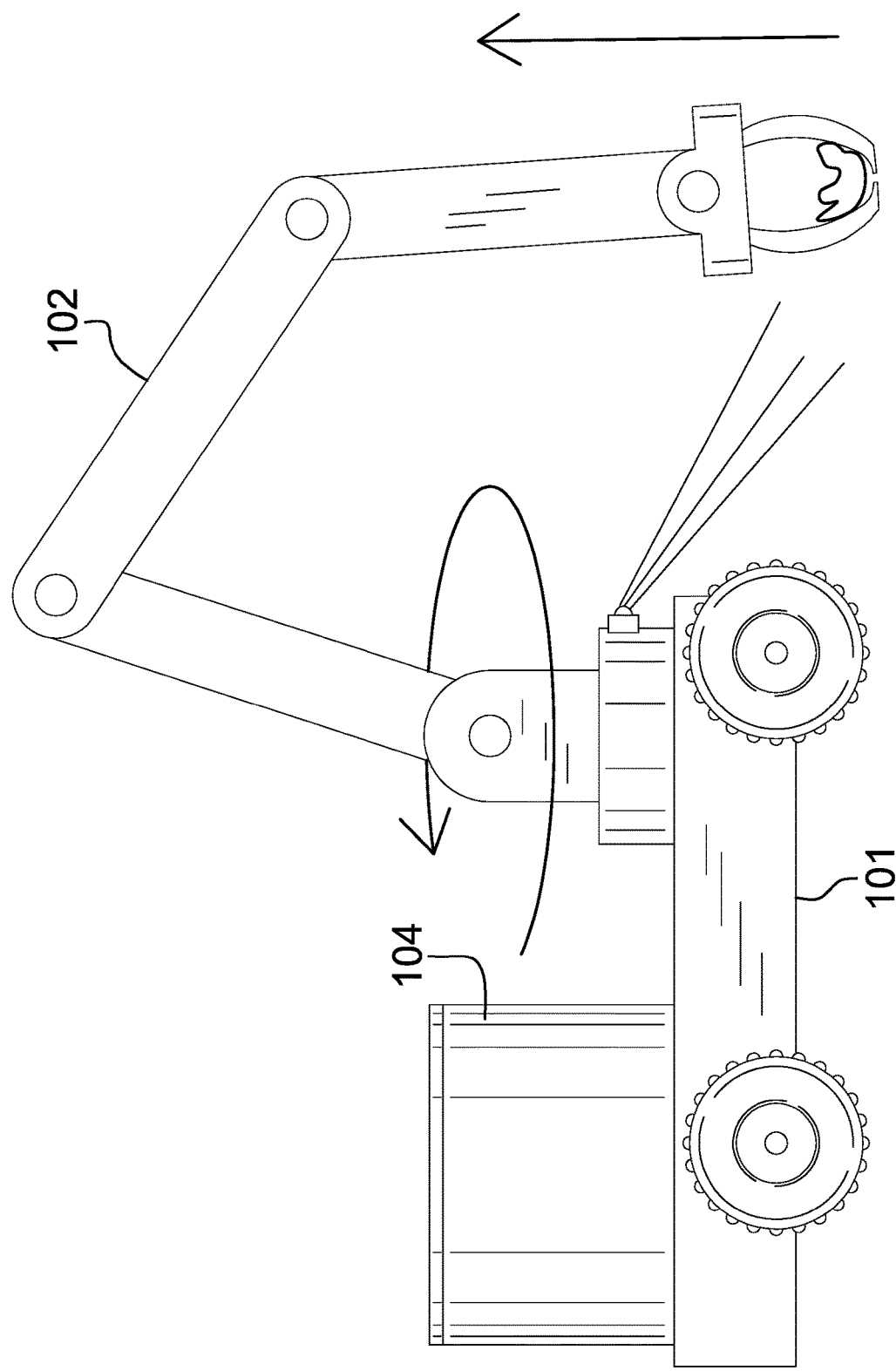
FIG. 7 is an in-use view of an embodiment of the disclosure.
Figure 8:
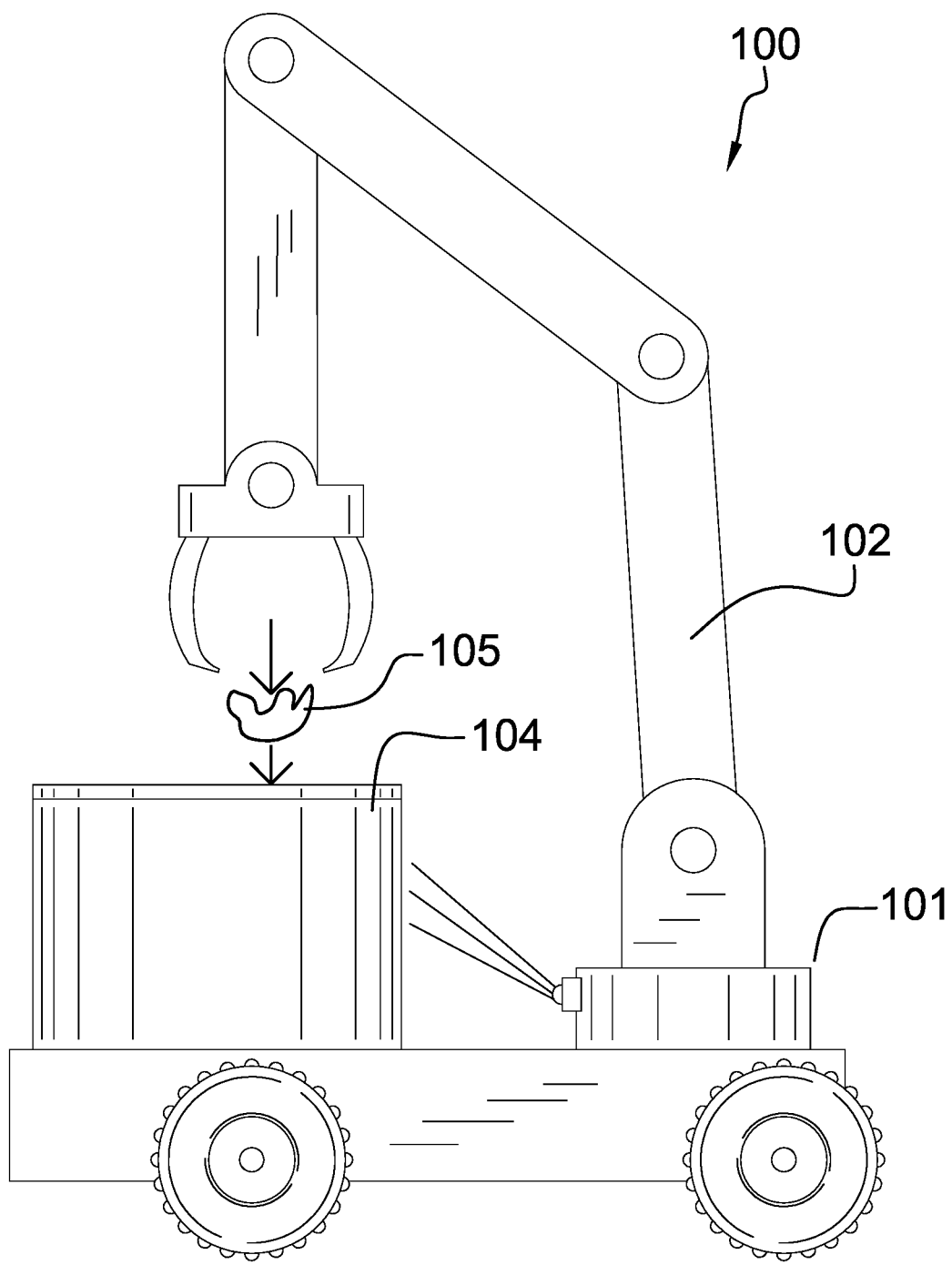
FIG. 8 is an in-use view of an embodiment of the disclosure.
Figure 9:
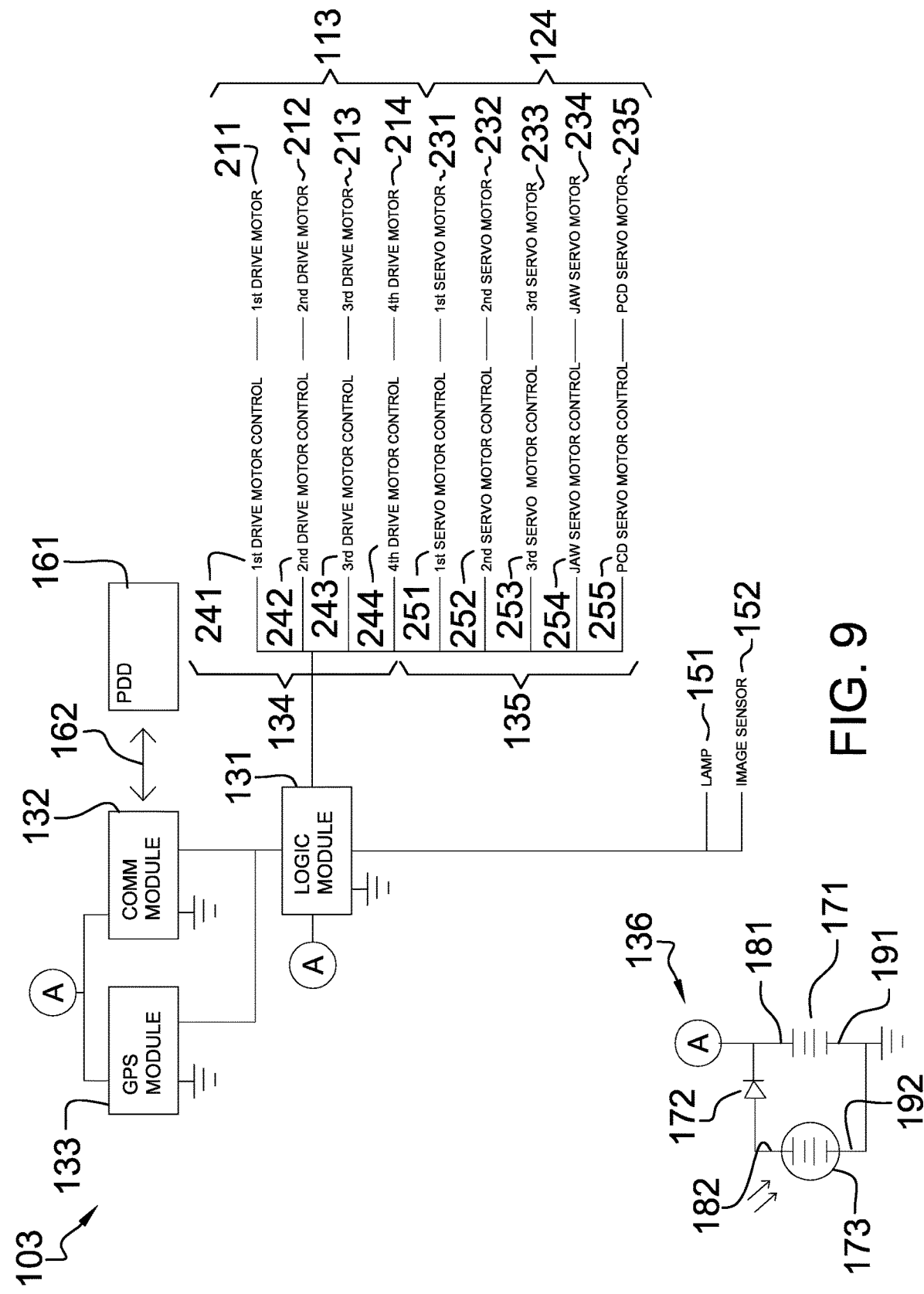
FIG. 9 is a schematic view of an embodiment of the disclosure.

Detailed reference will now be made to one or more potential embodiments of the disclosure, which are illustrated in FIGS. 1 through 9.

The animal waste collection robot 100 (hereinafter invention) is a robot. The invention 100 is adapted for use with a companion animal. The invention 100 automatically collects befoulment 105 generated by the companion animal. The invention 100 is an automated device. The invention 100 is an independently powered electric circuit. By independently powered is meant that the invention 100 can operate without an electrical connection to an external power source. The invention 100 comprises a vehicle 101, a crane 102, a control circuit 103, and a pan 104. The control circuit 103 mounts in the vehicle 101. The crane 102 and the pan 104 mount on the vehicle 101. The vehicle 101 transports the invention 100 over a patrol route. The control circuit 103: a) scans the patrol route for befoulment 105; b) operates the crane 102 to collect the befoulment 105; and, c) further operates the crane 102 to transport the befoulment 105 to the pan 104 for storage.

The pan 104 is a containment structure. The pan 104 receives and stores the befoulment 105. The pan 104 is a prism-shaped structure. The pan 104 is a hollow structure. The pan 104 mounts on the superior face 141 of the vehicle 101 plate 111.

The vehicle 101 forms a pedestal that transfers the load of the invention 100 to the ground. The vehicle 101 is a rolling structure. The vehicle 101 transports the crane 102, the control circuit 103, and the pan 104 over a patrol route as the invention 100 is searching for befoulment 105. The control circuit 103 controls the operation and the navigation of the vehicle 101. The control circuit 103 provides the motive forces necessary to move the vehicle 101. The vehicle 101 comprises a vehicle 101 plate 111, a plurality of wheels 112, and a plurality of drive motors 113.

The vehicle 101 plate 111 is a prism structure. The vehicle 101 plate 111 has a disk shape. The vehicle 101 plate 111 is a rigid structure. The vehicle 101 plate 111 is formed from a corrosion resistant material. The vehicle 101 plate 111 is a hollow structure. The crane 102 and the pan 104 mount on the vehicle 101 plate 111. The vehicle 101 plate 111 forms a supporting surface that elevates the crane 102 and the pan 104 above the ground. The control circuit 103 mounts in the hollow interior of the vehicle 101 plate 111. The hollow interior of the vehicle 101 plate 111 forms a protected space for the control circuit 103. The vehicle 101 plate 111 further comprises a superior face 141 and a control circuit 103 chamber 142.

The superior face 141 forms the face of the disk structure of the vehicle 101 plate 111 that forms the superior surface of the vehicle 101. The control circuit 103 chamber 142 is a negative space that is formed in the interior of the disk structure of the vehicle 101 plate 111. The control circuit 103 chamber 142 is sized to contain the control circuit 103. The control circuit 103 chamber 142 is formed with all the apertures and form factors necessary to operate the control circuit 103.

Each of the plurality of wheels 112 is a rotating structure. Each wheel selected from the plurality of wheels 112 attaches to the vehicle 101 plate 111 such that the selected wheel rotates freely relative to the vehicle 101 plate 111. The plurality of wheels 112 forms the final link of the load path the transfers the load of the invention 100 to the ground. The plurality of wheels 112 mount on the vehicle 101 plate 111 such that the vehicle 101 rolls over the patrol route. The plurality of wheels 112 comprises a first wheel 201, a second wheel 202, a third wheel 203, and a fourth wheel 204.

The first wheel 201 is a driven wheel selected from the plurality of wheels 112. The second wheel 202 is a driven wheel selected from the plurality of wheels 112. The third wheel 203 is a driven wheel selected from the plurality of wheels 112. The fourth wheel 204 is a driven wheel selected from the plurality of wheels 112.

Each of the plurality of drive motors 113 is an electric motor. The control circuit 103 controls the operation of each drive motor selected from the plurality of drive motors 113. The control circuit 103 provides the electric energy necessary to power the operation of each drive motor selected from the plurality of drive motors 113. The control circuit 103 independently controls each drive motor selected from the plurality of drive motors 113. There is a one to one correspondence between the plurality of drive motors 113 and the plurality of wheels 112. Each drive motor selected from the plurality of drive motors 113 attaches to a wheel selected from the plurality of wheels 112 such that the selected drive motor provides the motive forces necessary to rotate the selected wheel associated with the selected drive motor. The plurality of drive motors 113 comprises a first drive motor 211, a second drive motor 212, a third drive motor 213, and a fourth drive motor 214.

The first drive motor 211 is the drive motor selected from the plurality of drive motors 113 that attaches to the first wheel 201. The first drive motor 211 provides the motive forces necessary to rotate the first wheel 201. The second drive motor 212 is the drive motor selected from the plurality of drive motors 113 that attaches to the second wheel 202. The second drive motor 212 provides the motive forces necessary to rotate the second wheel 202. The third drive motor 213 is the drive motor selected from the plurality of drive motors 113 that attaches to the third wheel 203. The third drive motor 213 provides the motive forces necessary to rotate the third wheel 203. The fourth drive motor 214 is the drive motor selected from the plurality of drive motors 113 that attaches to the fourth wheel 204. The fourth drive motor 214 provides the motive forces necessary to rotate the fourth wheel 204.

The crane 102 is a mechanical structure. The crane 102 is defined elsewhere in this disclosure. The control circuit 103 controls the operation of the crane 102. The crane 102 mounts on the superior face 141 of the vehicle 101 plate 111. The crane 102 is a rotating structure. The crane 102 rotates relative to the vehicle 101. The crane 102 physically collects the befoulment 105 from the ground. The crane 102 elevates the befoulment 105 above the ground. The crane 102 transports the collected befoulment 105 to the pan 104. The crane 102 releases the befoulment 105 into the pan 104 for storage. The crane 102 comprises a plurality of arms 121, a pedestal bearing 122, a capture jaw 123, and a plurality of servo motors 124.

Each of the plurality of arms 121 is a rigid structure. Each of the plurality of arms 121 is a shaft structure. Each of the plurality of arms 121 is formed from a corrosion resistant material. The plurality of arms 121 forms the load path that transfers the load of the capture jaw 123 to the pedestal bearing 122. Each of the plurality of arms 121 forms a link in the load path formed by the plurality of arms 121. The plurality of arms 121 are mechanically interconnected to form a rotating structure. Any arm initially selected from the plurality of arms 121 rotates relative to any arm subsequently selected from the plurality of arms 121. The control circuit 103 controls the rotation of the plurality of arms 121. The rotating nature of the plurality of arms 121 allows the control circuit 103 to adjust the position of the capture jaw 123 relative to the vehicle 101 plate 111 in three dimensions. The plurality of arms 121 comprises a first arm 221, a second arm 222, a third arm 223, and a fourth arm 224.

The first arm 221 is the arm selected from the plurality of arms 121 that secures the second arm 222 to the pedestal bearing 122. The second arm 222 is the arm selected from the plurality of arms 121 that secures the first arm 221 to the third arm 223. The third arm 223 is the arm selected from the plurality of arms 121 that secures the second arm 222 to the fourth arm 224. The fourth arm 224 is the arm selected from the plurality of arms 121 that secures the third arm 223 to the capture jaw 123.

The pedestal bearing 122 is a slewing bearing. The pedestal bearing 122 is formed from a corrosion resistant material. The pedestal bearing 122 attaches to the superior face 141 of the vehicle 101 plate 111. The pedestal bearing 122 attaches the first arm 221 of the plurality of arms 121 to the vehicle 101 plate 111. The pedestal bearing 122 is a rotating structure. The pedestal bearing 122 rotates the first arm 221 relative to the plurality of arms 121 around an axis of rotation that is perpendicular to the superior face 141 of the vehicle 101 plate 111. The control circuit 103 controls the rotation of the pedestal bearing 122.

The capture jaw 123 is a grasping structure. The capture jaw 123 is formed from a corrosion resistant material. The capture jaw 123 is a rotating structure. The capture jaw 123 attaches to the end of the load path formed by the plurality of arms 121 that is distal from the pedestal bearing 122. The capture jaw 123 rotates relative to itself and relative to the plurality of arms 121. The control circuit 103 controls the rotation of the capture jaw 123. The capture jaw 123 is the mechanical structure that collects the befoulment 105.

The control circuit 103 controls the position of the capture jaw 123 relative to the befoulment 105 by rotating the plurality of arms 121 and the pedestal bearing 122 to change the relative positions of the plurality of arms 121, the pedestal bearing 122, and the capture jaw 123. The control circuit 103 controls the rotation of the capture jaw 123 such that the capture jaw 123 captures the befoulment 105. The control circuit 103 controls the position of the capture jaw 123 relative to the pan 104 by rotating the plurality of arms 121 and the pedestal bearing 122 to change the relative positions of the plurality of arms 121, the pedestal bearing 122, and the capture jaw 123. The control circuit 103 controls the release of the befoulment 105 from the capture jaw 123 into the pan 104.

Each of the plurality of servo motors 124 is an electric motor. The servo motor is defined elsewhere in this disclosure. Each of the plurality of servo motors 124 is a fastening structure. Each of the plurality of servo motors 124 forms a mechanical connection selected from the group consisting of: a) attaching an arm initially selected from the plurality of arms 121 to an arm subsequently selected from the plurality of arms 121; b) attaching the capture jaw 123 to an arm selected from the plurality of arms 121; and, c) attaching the pedestal bearing 122 to the superior face 141 of the vehicle 101 plate 111. Each of the plurality of servo motors 124 is a rotating structure. Each of the plurality of servo motors 124 provides the motive forces required to rotate the first attached structure to the second attached structure. The control circuit 103 independently controls each drive motor selected from the plurality of servo motors 124. The plurality of servo motors 124 comprises a first servo motor 231, a second servo motor 232, a third servo motor 233, a jaw servo motor 234, and a pedestal servo motor 235.

The first servo motor 231 attaches the first arm 221 to the second arm 222 such that the second arm 222 rotates relative to the first arm 221. The first servo motor 231 provides the motive forces that rotate the second arm 222 relative to the first arm 221.

The second servo motor 232 attaches the second arm 222 to the third arm 223 such that the third arm 223 rotates relative to the second arm 222. The second servo motor 232 provides the motive forces that rotate the third arm 223 relative to the second arm 222.

The third servo motor 233 attaches the third arm 223 to the fourth arm 224 such that the fourth arm 224 rotates relative to the third arm 223. The third servo motor 233 provides the motive forces that rotate the fourth arm 224 relative to the third arm 223.

The jaw servo motor 234 attaches the fourth arm 224 to the capture jaw 123 such that the capture jaw 123 rotates relative to the fourth arm 224. The jaw servo motor 234 provides the motive forces that rotate the fourth arm 224 relative to the capture jaw 123.

The pedestal servo motor 235 attaches the pedestal bearing 122 to the superior face 141 such that the pedestal bearing 122 rotates relative to the vehicle 101 plate 111. The pedestal servo motor 235 provides the motive forces that rotate the pedestal bearing 122 relative to the superior face 141.

The control circuit 103 is an electric circuit. The control circuit 103 mounts in the control circuit 103 chamber 142 of the vehicle 101 plate 111. The control circuit 103 controls the operation of the vehicle 101. The control circuit 103 controls the navigation of the vehicle 101. The control circuit 103 provides the motive forces necessary to move the vehicle 101. The control circuit 103 controls the operation of the crane 102. The control circuit 103 identifies the location of the crane 102. The control circuit 103 rotates the crane 102 into a position to capture the befoulment 105. The control circuit 103 causes the crane 102 to capture the befoulment 105. The control circuit 103 rotates the crane 102 to position the befoulment 105 over the pan 104. The control circuit 103 causes the crane 102 to release the befoulment 105 into the pan 104. The control circuit 103 is an independently powered electric circuit. By independently powered is meant that the control circuit 103 can operate without an electrical connection to an external power source.

The control circuit 103 comprises a logic module 131, a communication module 132, a GPS module 133, a plurality of drive motor 113 controllers 134, a plurality of servo motor 124 controllers 135, and a power circuit 136. The logic module 131, the communication module 132, the GPS module 133, the plurality of drive motor 113 controllers 134, the plurality of servo motor 124 controllers 135, and the power circuit 136 are electrically connected.

The logic module 131 is a readily and commercially available programmable electronic device that is used to manage, regulate, and operate the control circuit 103. Depending on the specific design and the selected components, the logic module 131 can be a separate component within the control circuit 103 or the functions of the logic module 131 can be incorporated into another component within the control circuit 103. The communication module 132 is a wireless electronic communication device that allows the logic module 131 to wirelessly communicate with the personal data device 161. Specifically, the communication module 132 establishes a wireless communication link 162 between the control circuit 103 and the personal data device 161. In the first potential embodiment of the disclosure, the communication module 132 supports a communication protocol selected from the group consisting of a WiFi™ protocol or a Bluetooth™ protocol.

The personal data device 161 is a programmable electrical device that provides data management and communication services through one or more functions referred to as an application. The application is a set of logical operating instructions that are performed by the personal data device 161. The addition of an application will provide increased functionality for the personal data device 161. The personal data device 161 transmits operating instruction to the logic module 131 over the wireless communication link 162 with the communication module 132. This disclosure assumes that an application exists for the purpose of interacting with the invention 100. Methods to design and implement an application on a personal data device 161 are well known and documented in the electrical arts.

The logic module 131 controls the operation of the communication module 132. The logic module 131 controls the operation of the GPS module 133. The logic module 131 independently controls the operation of each drive motor controller selected from the plurality of drive motor 113 controllers 134. The logic module 131 independently controls the operation of each servo motor controller selected from the plurality of servo motor 124 controllers 135. The logic module 131 controls the navigation of the vehicle 101 along the patrol route by controlling the operation of each of the plurality of drive motor 113 controllers 134. The logic module 131 identifies the location of the befoulment 105 along the patrol route. The logic module 131 controls the collection of the befoulment 105 by the capture jaw 123 by controlling the operation of each of the plurality of servo motor 124 controllers 135. The logic module 131 controls the release of the befoulment 105 from the capture jaw 123 into the pan 104 by controlling the plurality of servo motor 124 controllers 135. The logic module 131 further comprises a lamp 151 and an image sensor 152.

The lamp 151 is an electric circuit. The lamp 151 is operated by the logic module 131. The lamp 151 generates a field of illumination that allows the image sensor 152 to capture images from within the field of illumination. The image sensor 152 is a sensor that captures light that is reflected towards the image sensor 152 from a field of view. The image sensor 152 transmits information about the captured light to the logic module 131. The logic module 131 processes the images received from the image sensor 152 to identify the location of the befoulment 105.

The GPS module 133 is an electrical device that communicates with the GPS to determine the GPS coordinates of the GPS module 133. When queried by the logic module 131, the GPS module 133 transfers the GPS coordinates to the logic module 131.

Each of the plurality of drive motor 113 controllers 134 is a motor controller. The motor controller is defined elsewhere in this disclosure. There is a one to one correspondence between the plurality of drive motor 113 controllers 134 and the plurality of drive motors 113. Each drive motor selected from the plurality of drive motor 113 controllers 134 controls the operation of a drive motor selected from the plurality of drive motors 113. By controlling the operation of the selected drive motor is meant that the drive motor controller selected from the plurality of drive motor 113 controllers 134 that is associated with the selected drive motor: a) controls the speed of rotation of the selected drive motor; and, b) controls the direction of rotation of the selected drive motor. The plurality of drive motor 113 controllers 134 comprises a first drive motor 211 controller 241, a second drive motor 212 controller 242, a third drive motor 213 controller 243, and a fourth drive motor 214 controller 244.

The first drive motor 211 controller 241 is the motor controller associated with the first drive motor 211. The first drive motor 211 controller 241 controls the speed of rotation and the direction of rotation of the first drive motor 211 based on the electric signals received from the logic module 131.

The second drive motor 212 controller 242 is the motor controller associated with the second drive motor 212. The second drive motor 212 controller 242 controls the speed of rotation and the direction of rotation of the second drive motor 212 based on the electric signals received from the logic module 131.

The third drive motor 213 controller 243 is the motor controller associated with the third drive motor 213. The third drive motor 213 controller 243 controls the speed of rotation and the direction of rotation of the third drive motor 213 based on the electric signals received from the logic module 131.

The fourth drive motor 214 controller 244 is the motor controller associated with the fourth drive motor 214. The fourth drive motor 214 controller 244 controls the speed of rotation and the direction of rotation of the fourth drive motor 214 based on the electric signals received from the logic module 131.

Each of the plurality of servo motor 124 controllers 135 is a motor controller. The motor controller is defined elsewhere in this disclosure. There is a one to one correspondence between the plurality of servo motor 124 controllers 135 and the plurality of servo motors 124. Each servo motor selected from the plurality of servo motor 124 controllers 135 controls the operation of a servo motor selected from the plurality of servo motors 124. By controlling the operation of the selected servo motor is meant that the servo motor controller selected from the plurality of servo motor 124 controllers 135 that is associated with the selected servo motor: a) controls the speed of rotation of the selected servo motor; and, b) controls the direction of rotation of the selected servo motor. The plurality of servo motor 124 controllers 135 comprises a first servo motor 231 controller 251, a second servo motor 232 controller 252, a third servo motor 233 controller 253, a jaw servo motor 234 controller 254, and a pedestal servo motor 235 controller 255.

The first servo motor 231 controller 251 is the motor controller associated with the first servo motor 231. The first servo motor 231 controller 251 controls the speed of rotation and the direction of rotation of the first servo motor 231 based on the electric signals received from the logic module 131.

The second servo motor 232 controller 252 is the motor controller associated with the second servo motor 232. The second servo motor 232 controller 252 controls the speed of rotation and the direction of rotation of the second servo motor 232 based on the electric signals received from the logic module 131.

The third servo motor 233 controller 253 is the motor controller associated with the third servo motor 233. The third servo motor 233 controller 253 controls the speed of rotation and the direction of rotation of the third servo motor 233 based on the electric signals received from the logic module 131.

The jaw servo motor 234 controller 254 is the motor controller associated with the jaw servo motor 234. The jaw servo motor 234 controller 254 controls the speed of rotation and the direction of rotation of the jaw servo motor 234 based on the electric signals received from the logic module 131.

The pedestal servo motor 235 controller 255 is the motor controller associated with the pedestal servo motor 235. The pedestal servo motor 235 controller 255 controls the speed of rotation and the direction of rotation of the pedestal servo motor 235 based on the electric signals received from the logic module 131.

The power circuit 136 is an electrical circuit. The power circuit 136 powers the operation of the control circuit 103. The power circuit 136 is an electrochemical device. The power circuit 136 converts chemical potential energy into the electrical energy required to power the control circuit 103. The power circuit 136 comprises a battery 171, a diode 172, and a photovoltaic cell 173. The battery 171, the diode 172, and the photovoltaic cell 173 are electrically interconnected. The battery 171 further comprises a first positive terminal 181 and a first negative terminal 191. The photovoltaic cell 173 further comprises a second positive terminal 182 and a second negative terminal 192.

The battery 171 is an electrochemical device. The battery 171 converts chemical potential energy into the electrical energy used to power the control circuit 103. The battery 171 is a rechargeable battery 171. The photovoltaic cell 173 is an electrical device that converts light into electrical energy. The chemical energy stored within the rechargeable battery 171 is further renewed and restored through the use of the photovoltaic cell 173. The photovoltaic cell 173 is directly wired to the battery 171. The photovoltaic cell 173 is an electrical circuit that reverses the polarity of the rechargeable battery 171 and provides the energy necessary to reverse the chemical processes that the rechargeable battery 171 initially used to generate the electrical energy. This reversal of the chemical process creates a chemical potential energy that will later be used by the rechargeable battery 171 to generate electricity.

The diode 172 is an electrical device that allows current to flow in only one direction. The diode 172 installs between the rechargeable battery 171 and the photovoltaic cell 173 such that electricity will not flow from the first positive terminal 181 of the rechargeable battery 171 into the second positive terminal 182 of the photovoltaic cell 173. The photovoltaic cell 173 is defined elsewhere in this disclosure.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Animal: As used in this disclosure, an animal is a biological organism that consumes organic material as its primary energy source for metabolism, requires oxygen for its primary metabolic processes, reproduces sexually, and forms tissues.

Automatic: As used in this disclosure, automatic refers to a device, process, or a system that operates without human control, supervision or participation in the operation of the device, process, or system. The verb form of automatic is to automate.

Barrier: As used in this disclosure, a barrier is a physical obstacle that forms a boundary between a first space and a second space. The barrier prevents the passage of an object between the first space and the second space.

Battery: As used in this disclosure, a battery is a chemical device consisting of one or more cells, in which chemical energy is converted into electricity and used as a source of power. Batteries are commonly defined with a positive terminal and a negative terminal.

Befoulment: As used in this disclosure, befoulment refers to the excrement and other biological eliminations of a companion animal.

Bluetooth™: As used in this disclosure, Bluetooth™ is a standardized communication protocol that is used to wirelessly interconnect electronic devices.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prisms or pyramidal structures share the same line they are said to be aligned. When the center axes of two cylinder, prisms or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Companion Animal: As used in this disclosure, a companion animal is a domesticated animal that is maintained primarily for companionship. A companion animal is often referred to as a pet.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Corrosion: As used in this disclosure, corrosion refers to a reduction of the performance, stability, or integrity of a structure that is caused by (generally undesired) chemical (including electrochemical) reactions. A corrosion resistant material refers to the use of an unreactive, or low reactivity, material. Stainless steel, aluminum (after oxidization), and polyvinylchloride are examples of corrosion resistant materials.

Crane: As used in this disclosure, a crane is a mechanical structure that: a) suspends an object above a supporting surface; and, b) rotates such that the crane can relocate or otherwise move the object. A crane is often mounted on a vehicle such that the crane can be used to carry an object more distant location. The arm of a crane refers to the structure of the crane that forms the load path that elevates the object.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Elimination: As used in this disclosure, an elimination refers to a solid phase discharge from a biological entity.

Excretion: As used in this disclosure, an excretion refers to a liquid phase discharge from a biological entity.

External Power Source: As used in this disclosure, an external power source is a source of the energy that is externally provided to enable the operation of the present disclosure. Examples of external power sources include, but are not limited to, electrical power sources and compressed air sources.

Feedback: As used in this disclosure, feedback refers to a system, including engineered systems, or a subsystem further comprising an "input" and an "output" wherein the difference between the output of the engineered system or subsystem and a reference is used as, or fed back into, a portion of the input of the system or subsystem. Examples of feedback in engineered systems include, but are not limited to, a fluid level control device such as those typically used in a toilet tank, a cruise control in an automobile, a fly ball governor, a thermostat, and almost any electronic device that comprises an amplifier. Feedback systems in nature include, but are not limited to, thermal regulation in animals and blood clotting in animals (wherein the platelets involved in blood clotting release chemical to attract other platelets).

Field of Illumination: As used in this disclosure, a field of illumination refers to an area illuminated by electromagnetic radiation projected from an electrical device such as a lamp or transmission antenna.

Field of View: As used in this disclosure, a field of view refers to one or more angles which delimits an area from which electromagnetic radiation will be sensed by a person or an image sensor.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

GPS: As used in this disclosure, and depending on the context, GPS refers to: 1) a system of navigational satellites that are used to determine the position, known as GPS coordinates, and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System. Methods to determine the distance and direction between any two sets of GPS coordinates are well-known and documented in the navigational arts.

Ground: As used in this disclosure, the ground is a solid supporting surface formed by the Earth. The term level ground means that the supporting surface formed by the ground is roughly perpendicular to the force of gravity.

Hinge: As used in this disclosure, a hinge is a device that permits the turning, rotating, or pivoting of a first object relative to a second object. A hinge designed to be fixed into a set position after rotation is called a locking hinge. A spring loaded hinge is a hinge formed as an elastic structure. The elastic structure of the spring loaded hinge is deformed under a rotating force such that the elastic structure returns the spring loaded hinge back to its relaxed shape after the rotating force is removed from the spring loaded hinge.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Image Sensor: As used in this disclosure, an image sensor receives light from the exterior of the image sensor and converts the received light into a digital representation of sufficient detail to allow a logic module to create and display a visual reproduction of the source of the captured light.

Independent: As used in this disclosure, the term independent refers to the relationship between the operation and control of a first device and a second device. The first device and the second device are independent from each other if: a) the operation of the first device is neither impacted nor influenced by the operation of the second device; and, b) the operation of the second device is neither impacted nor influenced by the operation of the first device.

Inferior: As used in this disclosure, the term inferior refers to a directional reference that is parallel to and in the same direction as the force of gravity when an object is positioned or used normally.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Metabolism: As used in this disclosure, metabolism refers to the chemical processes that occur within a living cell.

Motor: As used in this disclosure, a motor refers to the method of transferring energy from an external power source into rotational mechanical energy.

Motor Controller: As used in this disclosure, a motor controller is an electrical device that is used to control the rotational speed, or simply the speed, and the direction of rotation of an electric motor. Motor controllers will generally receive one or more inputs which are used determine the desired rotational speed and direction of rotation of the electric motor.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

PDD: As used in this disclosure, PDD is an acronym for personal data device.

Pedestal: As used in this disclosure, a pedestal is an intermediary load bearing structure that forms a load path between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Personal Data Device: As used in this disclosure, a personal data device is a handheld logical device that is used for managing personal information and communication. Examples of personal data device include, but are not limited to, cellular phones, tablets, and smartphones. See logical device Photovoltaic Cell: As used in this disclosure, a photovoltaic cell is a photoelectric device that directly converts light energy into electrical energy.

Pivot: As used in this disclosure, a pivot is a rod or shaft around which an object rotates or swings.

Plug: As used in this disclosure, a plug is an electrical termination that electrically connects a first electrical circuit to a second electrical circuit or a source of electricity. As used in this disclosure, a plug will have two or three metal pins.

Polyvinylchloride: As used in this disclosure, polyvinylchloride (CAS 9006-86-2) refers to a polymer formed from vinyl chloride (CAS 75-01-4). The structure of vinyl chloride is $CH_2=CClH$. The common abbreviation for polyvinylchloride is PVC.

Port: As used in this disclosure, a port is an electrical termination that is used to connect a first electrical circuit to a second external electrical circuit. In this disclosure, the port is designed to receive a plug.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; or, b) maintains an environment suitable within the protected space that is appropriate for the object.

Rigid Structure: As used in this disclosure, a rigid structure is a solid structure formed from an inelastic material that resists changes in shape. A rigid structure will permanently deform as it fails under a force.

Remote Control: As used in this disclosure, remote control means the establishment of control of a device from a distance. Remote control is generally accomplished through the use of an electrical device that generates electrically based control signals that are transmitted via radio frequencies or other means to the device.

Robot: As used in this disclosure, a robot is a programmable electronic device that automatically performs a series of predetermined actions.

Servo Motor: As used in this disclosure, a servo motor is an electrical motor that further incorporates a feedback circuit that allows for the precise angular positioning of the electric motor.

Slew: As used in this disclosure, to slew means to turn or rotate an object around a fixed point or axis.

Slewing Bearing: As used in this disclosure, a slewing bearing is a device that is used to rotate an object on a horizontal surface. Slewing bearings are typically load bearing structures Slewing bearings are often called turntable bearings or a lazy Susan bearing.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Suspend: As used in this disclosure, to suspend an object means to support an object such that the inferior end of the object does not form a significant portion of the load path of the object. Include inferior superior and load path.

Tissue: As used in this disclosure, a tissue refers to a structure within a biological entity, commonly an animal. The tissue is an aggregation of specialized cells that performs a specific function within the biological entity. An organ is formed from a plurality of tissues. The tissues contained in the plurality of tissues often perform different functions.

Vehicle: As used in this disclosure, a vehicle is a motorized device that is used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Weather: As used in this disclosure, the term weather refers to a collection of measurable parameters of the atmosphere including, but not limited to, temperature, humidity, precipitation, and air movement caused by wind and energy and illumination from the sun. A structure that isolates an individual or object from the more uncomfortable or destructive aspects of the weather is said to provide protection against the weather. The term elements is often used to refer to weather.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

WiFi™: As used in this disclosure, WiFi™ refers to the physical implementation of a collection of wireless electronic communication standards commonly referred to as IEEE 802.11x.

With respect to the above description, it is to be realized that the optimum dimensional relationship for the various components of the invention described above and in FIGS. 1 through 9 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claimed is:

1. An animal waste collection robot comprising
a vehicle, a crane, a control circuit, and a pan;
wherein the control circuit mounts in the vehicle;
wherein the crane and the pan mount on the vehicle;
wherein the animal waste collection robot automatically collects befoulment;
wherein the animal waste collection robot is an automated device;
wherein the animal waste collection robot is an independently powered electric circuit;
wherein by independently powered is meant that the animal waste collection robot can operate without an electrical connection to an external power source;
wherein the vehicle transports the animal waste collection robot over a patrol route;
wherein the control circuit: a) operates the crane to collect the befoulment; and, b) further operates the crane to transport the befoulment to the pan for storage;
wherein the crane comprises a plurality of arms, a pedestal bearing, a capture jaw, and a plurality of servo motors;
wherein the plurality of arms forms the load path that transfers the load of the capture jaw to the pedestal bearing;
wherein each of the plurality of arms forms a link in the load path formed by the plurality of arms;
wherein the plurality of arms are mechanically interconnected to form a rotating structure;
wherein the plurality of servo motors rotate the plurality of arms relative to each other;
wherein the plurality of arms comprises a first arm, a second arm, a third arm, and a fourth arm;
wherein the first arm is the arm selected from the plurality of arms that secures the second arm to the pedestal bearing;
wherein the second arm is the arm selected from the plurality of arms that secures the first arm to the third arm;
wherein the third arm is the arm selected from the plurality of arms that secures the second arm to the fourth arm;
wherein the fourth arm is the arm selected from the plurality of arms that secures the third arm to the capture jaw.

2. The animal waste collection robot according to claim 1
wherein the pan is a containment structure;
wherein the pan receives and stores the befoulment;
wherein the pan has a pan structure;
wherein the pan is a hollow structure.

3. The animal waste collection robot according to claim 2
wherein the vehicle forms a pedestal that transfers the load of the animal waste collection robot to the ground;
wherein the vehicle is a rolling structure;
wherein the vehicle transports the crane, the control circuit, and the pan over the patrol route as the animal waste collection robot is searching for befoulment;
wherein the control circuit controls the operation and the navigation of the vehicle.

4. The animal waste collection robot according to claim 3
wherein the crane is a mechanical structure;
wherein the control circuit controls the operation of the crane;
wherein the crane mounts on the superior face of the vehicle plate;
wherein the crane is a rotating structure;
wherein the crane rotates relative to the vehicle;
wherein the crane physically collects the befoulment from the ground;
wherein the crane elevates the befoulment above the ground;
wherein the crane transports the collected befoulment to the pan;
wherein the crane releases the befoulment into the pan for storage.

5. The animal waste collection robot according to claim 4
wherein the control circuit is an electric circuit;
wherein the control circuit mounts in a control circuit chamber of the vehicle plate;
wherein the control circuit controls the operation of the vehicle;
wherein the control circuit controls the navigation of the vehicle;
wherein the control circuit controls the operation of the crane;
wherein the control circuit identifies the location of the crane;
wherein the control circuit rotates the crane into a position to capture the befoulment;

wherein the control circuit causes the crane to capture the befoulment;
wherein the control circuit rotates the crane to position the befoulment over the pan;
wherein the control circuit causes the crane to release the befoulment into the pan;
wherein the control circuit is an independently powered electric circuit;
wherein by independently powered is meant that the control circuit can operate without an electrical connection to an external power source.

6. The animal waste collection robot according to claim 5
wherein the vehicle comprises a vehicle plate, a plurality of wheels, and a plurality of drive motors;
wherein the plurality of wheels attach to the vehicle plate;
wherein the plurality of drive motors attach to the plurality of wheels.

7. The animal waste collection robot according to claim 6
wherein the control circuit comprises a logic module, a communication module, a GPS module, a plurality of drive motor controllers, a plurality of servo motor controllers, and a power circuit;
wherein the logic module, the communication module, the GPS module, the plurality of drive motor controllers, the plurality of servo motor controllers, and the power circuit are electrically connected;
wherein the power circuit is an electrical circuit;
wherein the power circuit powers the operation of the control circuit;
wherein the power circuit comprises a battery, a diode, and a photovoltaic cell;
wherein the battery, the diode, and the photovoltaic cell are electrically interconnected;
wherein the battery further comprises a first positive terminal and a first negative terminal;
wherein the photovoltaic cell further comprises a second positive terminal and a second negative terminal.

8. The animal waste collection robot according to claim 7
wherein the vehicle plate has a disk shape;
wherein the vehicle plate is a rigid structure;
wherein the vehicle plate is a hollow structure;
wherein the crane and the pan mount on the vehicle plate;
wherein the vehicle plate forms a supporting surface that elevates the crane and the pan above the ground;
wherein the control circuit mounts in the hollow interior of the vehicle plate;
wherein the hollow interior of the vehicle plate forms a protected space for the control circuit.

9. The animal waste collection robot according to claim 8
wherein the vehicle plate further comprises a superior face and the control circuit chamber;
wherein the superior face forms the face of the disk structure of the vehicle plate that forms the superior surface of the vehicle;
wherein the pan mounts on the superior face of the vehicle plate;
wherein the control circuit chamber is a negative space that is formed in the interior of the disk structure of the vehicle plate;
wherein the control circuit chamber is sized to contain the control circuit.

10. The animal waste collection robot according to claim 9
wherein each of the plurality of wheels is a rotating structure;
wherein each wheel selected from the plurality of wheels attaches to the vehicle plate such that the selected wheel rotates freely relative to the vehicle plate;
wherein the plurality of wheels forms the final link of the load path the transfers the load of the animal waste collection robot to the ground;
wherein the plurality of wheels mount on the vehicle plate such that the vehicle rolls over the patrol route;
wherein each of the plurality of drive motors is an electric motor;
wherein the control circuit controls the operation of each drive motor selected from the plurality of drive motors;
wherein the control circuit independently controls each drive motor selected from the plurality of drive motors;
wherein there is a one to one correspondence between the plurality of drive motors and the plurality of wheels;
wherein each drive motor selected from the plurality of drive motors attaches to a wheel selected from the plurality of wheels such that the selected drive motor provides the motive forces necessary to rotate the selected wheel associated with the selected drive motor.

11. The animal waste collection robot according to claim 10
wherein each of the plurality of arms is a rigid structure;
wherein each of the plurality of arms is a shaft structure;
wherein any arm initially selected from the plurality of arms rotates relative to any arm subsequently selected from the plurality of arms;
wherein the control circuit controls the rotation of the plurality of arms;
wherein the rotating nature of the plurality of arms allows the control circuit to adjust the position of the capture jaw relative to the vehicle plate in three dimensions.

12. The animal waste collection robot according to claim 11
wherein the pedestal bearing is a clewing bearing;
wherein the pedestal bearing attaches to the superior face of the vehicle plate;
wherein the pedestal bearing attaches the first arm of the plurality of arms to the vehicle plate;
wherein the pedestal bearing is a rotating structure;
wherein the pedestal bearing rotates the first arm relative to the plurality of arms around an axis of rotation that is perpendicular to the superior face of the vehicle plate;
wherein the control circuit controls the rotation of the pedestal bearing;
wherein the capture jaw is a grasping structure;
wherein the capture jaw is a rotating structure;
wherein the capture jaw attaches to the end of the load path formed by the plurality of arms that is distal from the pedestal bearing;
wherein the capture jaw rotates relative to itself and relative to the plurality of arms;
wherein the control circuit controls the rotation of the capture jaw;
wherein the capture jaw is the mechanical structure that collects the befoulment;
wherein the control circuit controls the position of the capture jaw relative to the befoulment by rotating the plurality of arms and the pedestal bearing to change the relative positions of the plurality of arms, the pedestal bearing, and the capture jaw;
wherein the control circuit controls the rotation of the capture jaw such that the capture jaw captures the befoulment;

wherein the control circuit controls the position of the capture jaw relative to the pan by rotating the plurality of arms and the pedestal bearing to change the relative positions of the plurality of arms, the pedestal bearing, and the capture jaw;

wherein the control circuit controls the release of the befoulment from the capture jaw into the pan.

13. The animal waste collection robot according to claim 12 wherein each of the plurality of servo motors is an electric motor;

wherein each of the plurality of servo motors is a fastening structure;

wherein each of the plurality of servo motors forms a mechanical connection selected from the group consisting of: a) attaching an arm initially selected from the plurality of arms to an arm subsequently selected from the plurality of arms; b) attaching the capture jaw to an arm selected from the plurality of arms; and, c) attaching the pedestal bearing to the superior face of the vehicle plate;

wherein each of the plurality of servo motors is a rotating structure;

wherein each of the plurality of servo motors provides the motive forces required to rotate the first attached structure to the second attached structure;

wherein the control circuit independently controls each drive motor selected from the plurality of servo motors.

14. The animal waste collection robot according to claim 13 wherein the logic module is an electronic device;

wherein the logic module controls the operation of the communication module;

wherein the logic module controls the operation of the GPS module;

wherein the logic module independently controls the operation of each drive motor controller selected from the plurality of drive motor controllers;

wherein the logic module independently controls the operation of each servo motor controller selected from the plurality of servo motor controllers;

wherein the logic module controls the navigation of the vehicle along the patrol route by controlling the operation of each of the plurality of drive motor controllers;

wherein the logic module controls the collection of the befoulment by the capture jaw by controlling the operation of each of the plurality of servo motor controllers;

wherein the logic module controls the release of the befoulment from the capture jaw into the pan by controlling the plurality of servo motor controllers;

wherein the GPS module is an electrical device that communicates with the GPS to determine the GPS coordinates of the GPS module;

wherein when queried by the logic module, the GPS module transfers the GPS coordinates to the logic module;

wherein the logic module further comprises a lamp and an image sensor;

wherein the lamp is an electric circuit;

wherein the lamp is operated by the logic module;

wherein the lamp generates a field of illumination that allows the image sensor to capture images from within the field of illumination;

wherein the image sensor is a sensor that captures light that is reflected towards the image sensor from a field of view;

wherein the image sensor transmits information about the captured light to the logic module;

wherein the logic module processes the images received from the image sensor to identify the location of the befoulment.

15. The animal waste collection robot according to claim 14 wherein each of the plurality of drive motor controllers is a motor controller;

wherein there is a one to one correspondence between the plurality of drive motor controllers and the plurality of drive motors;

wherein each drive motor selected from the plurality of drive motor controllers controls the operation of a drive motor selected from the plurality of drive motors;

wherein by controlling the operation of the selected drive motor is meant that the drive motor controller selected from the plurality of drive motor controllers that is associated with the selected drive motor: a) controls the speed of rotation of the selected drive motor; and, b) controls the direction of rotation of the selected drive motor.

16. The animal waste collection robot according to claim 15 wherein each of the plurality of servo motor controllers is a motor controller;

wherein there is a one to one correspondence between the plurality of servo motor controllers and the plurality of servo motors;

wherein each servo motor selected from the plurality of servo motor controllers controls the operation of a servo motor selected from the plurality of servo motors;

wherein by controlling the operation of the selected servo motor is meant that the servo motor controller selected from the plurality of servo motor controllers that is associated with the selected servo motor: a) controls the speed of rotation of the selected servo motor; and, b) controls the direction of rotation of the selected servo motor.

17. The animal waste collection robot according to claim 16 wherein the battery is a rechargeable battery;

wherein the photovoltaic cell is an electrical device that converts light into electrical energy;

wherein the photovoltaic cell is directly wired to the battery;

wherein the photovoltaic cell is an electrical circuit that reverses the polarity of the rechargeable battery;

wherein the diode is an electrical device that allows current to flow in only one direction;

wherein the diode installs between the rechargeable battery and the photovoltaic cell such that electricity will not flow from the first positive terminal of the rechargeable battery into the second positive terminal of the photovoltaic cell.

18. The animal waste collection robot according to claim 17 wherein the plurality of wheels comprises a first wheel, a second wheel, a third wheel, and a fourth wheel;

wherein the plurality of drive motors comprises a first drive motor, a second drive motor, a third drive motor, and a fourth drive motor;

wherein the first wheel is a driven wheel selected from the plurality of wheels;

wherein the second wheel is a driven wheel selected from the plurality of wheels;

wherein the third wheel is a driven wheel selected from the plurality of wheels;

wherein the fourth wheel is a driven wheel selected from the plurality of wheels;

wherein the first drive motor is the drive motor selected from the plurality of drive motors that attaches to the first wheel;

wherein the first drive motor provides the motive forces necessary to rotate the first wheel;

wherein the second drive motor is the drive motor selected from the plurality of drive motors that attaches to the second wheel;

wherein the second drive motor provides the motive forces necessary to rotate the second wheel;

wherein the third drive motor is the drive motor selected from the plurality of drive motors that attaches to the third wheel;

wherein the third drive motor provides the motive forces necessary to rotate the third wheel;

wherein the fourth drive motor is the drive motor selected from the plurality of drive motors that attaches to the fourth wheel;

wherein the fourth drive motor provides the motive forces necessary to rotate the fourth wheel;

wherein the plurality of servo motors comprises a first servo motor, a second servo motor, a third servo motor, a jaw servo motor, and a pedestal servo motor;

wherein the first servo motor attaches the first arm to the second arm such that the second arm rotates relative to the first arm;

wherein the first servo motor provides the motive forces that rotate the second arm relative to the first arm;

wherein the second servo motor attaches the second arm to the third arm such that the third arm rotates relative to the second arm;

wherein the second servo motor provides the motive forces that rotate the third arm relative to the second arm;

wherein the third servo motor attaches the third arm to the fourth arm such that the fourth arm rotates relative to the third arm;

wherein the third servo motor provides the motive forces that rotate the fourth arm relative to the third arm;

wherein the jaw servo motor attaches the fourth arm to the capture jaw such that the capture jaw rotates relative to the fourth arm;

wherein the jaw servo motor provides the motive forces that rotate the fourth arm relative to the capture jaw;

wherein the pedestal servo motor attaches the pedestal bearing to the superior face such that the pedestal bearing rotates relative to the vehicle plate;

wherein the pedestal servo motor provides the motive forces that rotate the pedestal bearing relative to the superior face;

wherein the plurality of drive motor controllers comprises a first drive motor controller, a second drive motor controller, a third drive motor controller, and a fourth drive motor controller;

wherein the first drive motor controller is the motor controller associated with the first drive motor;

wherein the first drive motor controller controls the speed of rotation and the direction of rotation of the first drive motor based on the electric signals received from the logic module;

wherein the second drive motor controller is the motor controller associated with the second drive motor;

wherein the second drive motor controller controls the speed of rotation and the direction of rotation of the second drive motor based on the electric signals received from the logic module;

wherein the third drive motor controller is the motor controller associated with the third drive motor;

wherein the third drive motor controller controls the speed of rotation and the direction of rotation of the third drive motor based on the electric signals received from the logic module;

wherein the fourth drive motor controller is the motor controller associated with the fourth drive motor;

wherein the fourth drive motor controller controls the speed of rotation and the direction of rotation of the fourth drive motor based on the electric signals received from the logic module;

wherein the plurality of servo motor controllers comprises a first servo motor controller, a second servo motor controller, a third servo motor controller, a jaw servo motor controller, and a pedestal servo motor controller;

wherein the first servo motor controller is the motor controller associated with the first servo motor;

wherein the first servo motor controller controls the speed of rotation and the direction of rotation of the first servo motor based on the electric signals received from the logic module;

wherein the second servo motor controller is the motor controller associated with the second servo motor;

wherein the second servo motor controller controls the speed of rotation and the direction of rotation of the second servo motor based on the electric signals received from the logic module;

wherein the third servo motor controller is the motor controller associated with the third servo motor;

wherein the third servo motor controller controls the speed of rotation and the direction of rotation of the third servo motor based on the electric signals received from the logic module;

wherein the jaw servo motor controller is the motor controller associated with the jaw servo motor;

wherein the jaw servo motor controller controls the speed of rotation and the direction of rotation of the jaw servo motor based on the electric signals received from the logic module;

wherein the pedestal servo motor controller is the motor controller associated with the pedestal servo motor;

wherein the pedestal servo motor controller controls the speed of rotation and the direction of rotation of the pedestal servo motor based on the electric signals received from the logic module.

\* \* \* \* \*